(12) United States Patent
Scaglione et al.

(10) Patent No.: US 9,330,818 B2
(45) Date of Patent: May 3, 2016

(54) ELECTRICAL CABLE RESISTANT TO FIRE, WATER AND MECHANICAL STRESSES

(71) Applicant: PRYSMIAN S.p.A., Milano (IT)

(72) Inventors: Antonio Scaglione, Milan (IT); Carlo Soccal, Milan (IT); Alessandro Mazzucato, Milan (IT); Riccardo Bucci, Milan (IT)

(73) Assignee: PRYSMIAN S.P.A., Milan (IT)

( * ) Notice: Subject to any disclaimer, the term of this patent is extended or adjusted under 35 U.S.C. 154(b) by 195 days.

(21) Appl. No.: 13/934,682

(22) Filed: Jul. 3, 2013

(65) Prior Publication Data
US 2014/0008098 A1    Jan. 9, 2014

(30) Foreign Application Priority Data
Jul. 5, 2012  (IT) .............................. MI2012A1178

(51) Int. Cl.
| H01B 7/18 | (2006.01) |
| H01B 7/295 | (2006.01) |
| H01B 7/28 | (2006.01) |
| H01B 7/282 | (2006.01) |
| H01B 7/02 | (2006.01) |

(52) U.S. Cl.
CPC .. H01B 7/18 (2013.01); H01B 7/28 (2013.01); H01B 7/2825 (2013.01); H01B 7/295 (2013.01)

(58) Field of Classification Search
USPC ....... 174/121, 107, 109, 110 R, 104; 428/383
See application file for complete search history.

(56) References Cited

U.S. PATENT DOCUMENTS

| 3,265,808 | A | * | 8/1966 | Binch | 174/105 R |
| 3,823,255 | A | * | 7/1974 | La Gase et al. | 174/113 R |
| 3,900,701 | A | * | 8/1975 | Bayles et al. | 174/102 R |
| 3,903,354 | A | * | 9/1975 | Dageforde | 174/107 |
| 4,547,626 | A | * | 10/1985 | Pedersen et al. | 174/107 |
| 4,653,851 | A | * | 3/1987 | Pedersen et al. | 385/103 |
| 4,946,237 | A | * | 8/1990 | Arroyo et al. | 385/107 |
| 5,227,586 | A | * | 7/1993 | Beauchamp | 174/122 R |
| 5,438,164 | A | * | 8/1995 | Green | 174/120 R |
| 5,705,774 | A | * | 1/1998 | Beauchamp | 174/121 R |
| 7,053,309 | B2 | * | 5/2006 | Efraimsson et al. | 174/113 R |

(Continued)

FOREIGN PATENT DOCUMENTS

| EP | 1 798 737 A1 | 6/2007 |
| FR | 2 573 910 | 5/1986 |
| GB | 1 582 580 | 1/1981 |

OTHER PUBLICATIONS

Ceramifying Polymers for Advanced Fire Protection Coatings K.W. Thomson, P.D.D. Rodrigo, C. M. Preston & G.J. Griffin.*

(Continued)

*Primary Examiner* — Timothy Thompson
*Assistant Examiner* — Michael F McAllister
(74) *Attorney, Agent, or Firm* — Finnegan, Henderson, Farabow, Garrett & Dunner, L.L.P.

(57) ABSTRACT

An electrical cable includes at least one conductor and a barrier arranged externally to the at least one conductor. The barrier includes two first layers including an inorganic material and a second layer including a polymer-metal composite material, the second layer being interposed between the two first layers. The electrical cable also includes, in an intermediate position between the at least one conductor and the barrier, solely discontinuous layers and/or layers of non-thermally-collapsible materials.

15 Claims, 2 Drawing Sheets

(56) References Cited

U.S. PATENT DOCUMENTS

| | | | |
|---|---|---|---|
| 7,247,797 B2 * | 7/2007 | Buthe et al. | 174/110 R |
| 7,297,873 B2 * | 11/2007 | Grogl et al. | 174/121 A |
| 7,378,595 B2 * | 5/2008 | Brambilla | 174/113 R |
| 2002/0046871 A1 | 4/2002 | Goeblmaier et al. | |
| 2002/0117325 A1 * | 8/2002 | Mennone et al. | 174/121 A |
| 2003/0091299 A1 * | 5/2003 | Priest et al. | 385/87 |
| 2004/0115422 A1 * | 6/2004 | Levit et al. | 428/323 |
| 2006/0040114 A1 * | 2/2006 | Gerhardinger et al. | 428/447 |
| 2006/0069201 A1 * | 3/2006 | Kondo et al. | 524/502 |
| 2006/0175075 A1 * | 8/2006 | Konnik et al. | 174/110 R |
| 2012/0000694 A1 * | 1/2012 | Kim et al. | 174/110 SR |

OTHER PUBLICATIONS

International Standard, "Conductors of insulated cables", CEI/IEC 60228;2004, Third Edition Nov. 2004, pp. 1-40.

International Standard, "Electrical installations in ships—Part 353: Power cables for rated voltages 1 kV and 3 kV", IEC 60092-353, Edition 3.0, Aug. 2011, pp. 1-41.

International Standard, "Electrical installations in ships—Part 350: General construction and test methods of power, control and instrumentation cables for shipboard and offshore applications", IEC 60092-350, Edition 3.0. Feb. 2008, pp. 1-52.

British Standard, "Method for assessment of fire integrity of large diameter power cables tor use as components for smoke and heat control systems and certain other active fire safety systems", BS 8491:2008, pp. 1-20.

European Standard, "Method of test for resistance to fire of unprotected small cables for use in emergency circuits", CENELEC EN 50200, May 2006, pp. 1-29.

IEC, "Final Draft International Standard", IEC 60331-1 Ed. 1.0, pp. 1-24.

IEC, "Final Draft International Standard", IEC 60331-2 Ed. 1.0, pp. 1-24.

International Standard, "Electrical installations in ships—Part 376: Cables for control and instrumentation circuits 150/250 V (300 V)", IEC 60092-376, Second Edition, May 2003, pp. 1-21.

Solas "Casualty threshold, safe return to port and safe return to port and safe areas", Safe Return to Port, Chapter 11-2, Regulation 21, pp. 78 and 293-299 (2010).

* cited by examiner

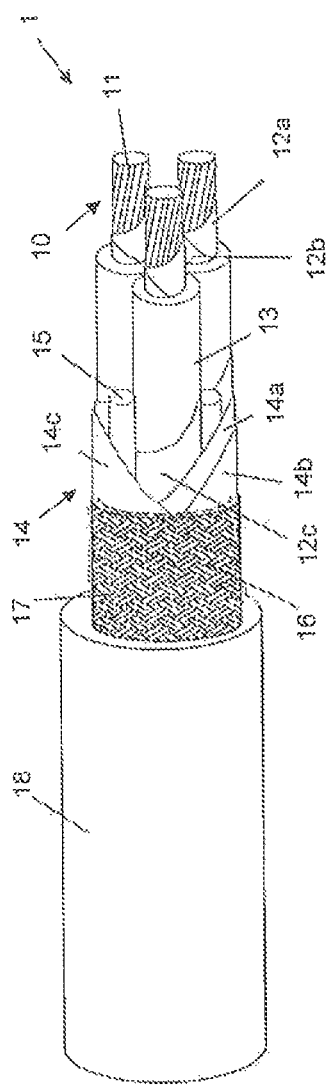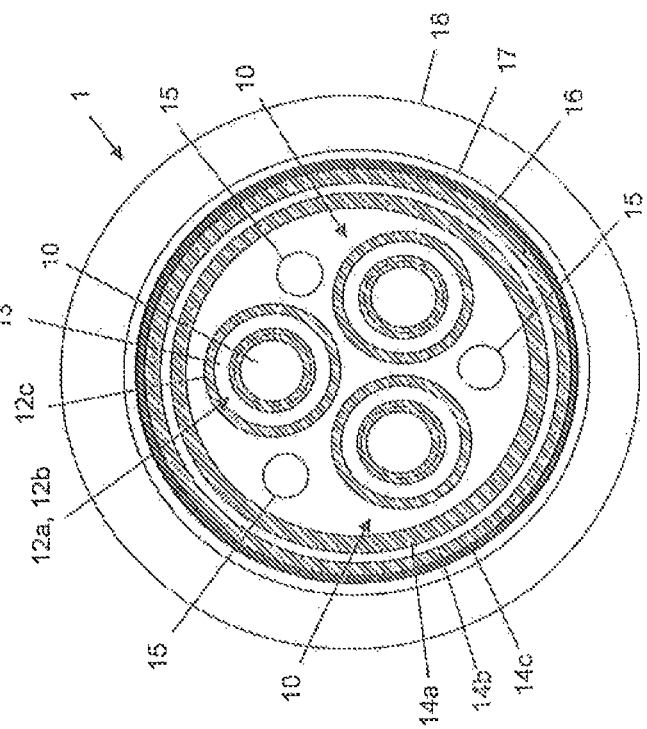

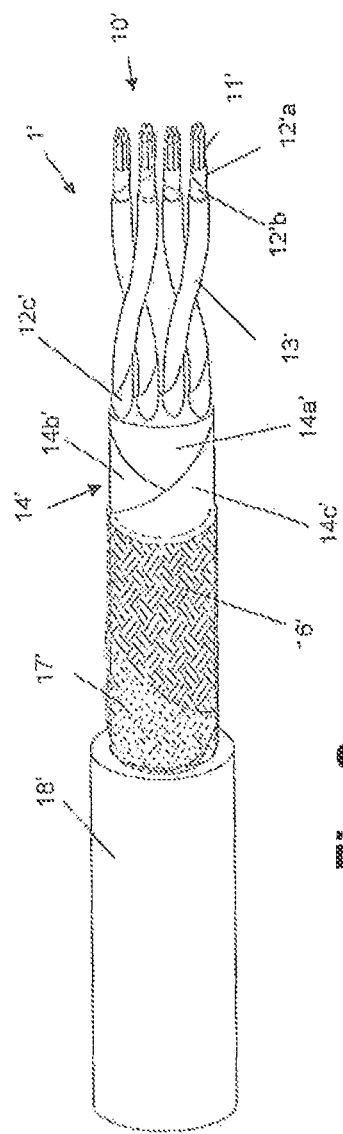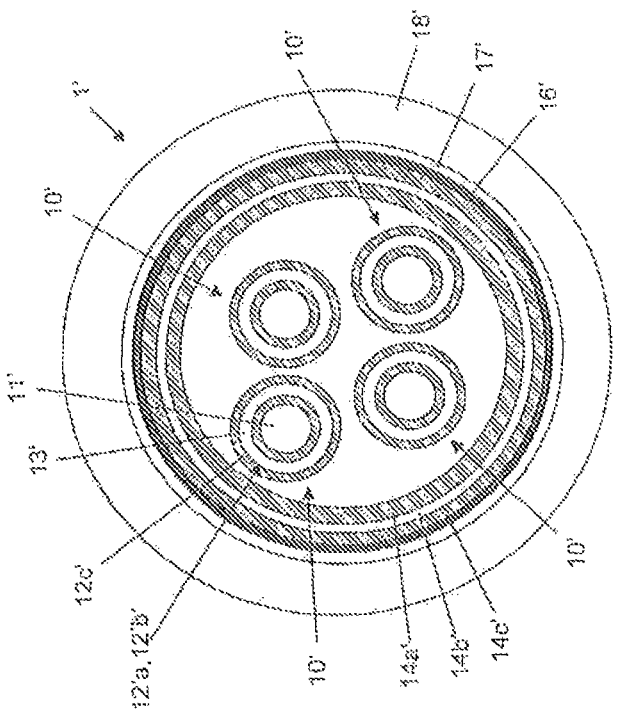
Fig. 2a
Fig. 2b

ELECTRICAL CABLE RESISTANT TO FIRE, WATER AND MECHANICAL STRESSES

BACKGROUND OF THE INVENTION

1. Field of the Invention

The present invention generally relates to the field of electrical cables. In particular, the present invention relates to an electrical cable resistant to fire, water and mechanical stresses.

2. Description of the Related Art

As is known, an electrical cable resistant to fire (known as a "fire resistant" cable) is a cable configured so as to be capable of continuing to function with acceptable electrical performance even if, owing to a fire, it is exposed to a naked flame for a period of time, at temperatures of up to 800° C.-900° C. or above.

Fire resistant electrical cables are used for various purposes including applications on ships or marine platforms. In these applications, it is necessary to ensure that certain electrical systems (such as lighting, sprinklers, bulkhead sealing systems and the like) will continue to operate for a given period after the outbreak of a fire, as specified, for example, in the SOLAS "Safe Return to Port" regulation, Chapter II-2/21.4. This makes it possible to extinguish the fire, to evacuate the area safely, and to return the ship to port if necessary.

To ensure correct operation, as well as fire resistance, the electrical cables must also have high impermeability to the water which is emitted by the fire-fighting systems (such as sprinklers and hydrants) and/or which results from any flooding. The electrical cables must also be capable of maintaining their characteristics of fire resistance and impermeability to water even in the presence of the intense mechanical stresses (such as vibration, impact, compression and the like) to which they are typically subjected during the fire extinguishing and evacuation operations.

EP 1 798 737 relates to flame resistant electric cables which, as subjected to a direct flame and a consequent temperature variation from 750° C. to 930° C., provide a safe current flow for a time period from 1 to 2 hours. In the cable, each individual wire is encompassed by a glass fibre strip onto which a mica layer has been glued. Outside this there are provided a layer thread braid impregnated by a polyurethane resin and an insulating elastomeric layer. The joined conductors are wrapped by a combined copper strip and a glass fibre strip to provide waterproof and insulating properties. For completing the cable it is finally coated by an outer coating layer of thermoplastic or elastomeric material.

U.S. Pat. No. 5,707,774 relates to a flame resistant electric cable which is capable of resisting temperatures in the neighborhood of 1000° C. for at least two hours. The cable comprises conductors, each of which is surrounded by an insulating layer of silicone rubber and a layer of braided inorganic material such as silica or ceramic. Outside the conductors, a further layer of aluminium/polyethylene terephthalate, a layer of silicone rubber, and an outer braided jacket, made of fiberglass material, are provided.

FR 2 573 910 describes a coating capable of protecting a cable from flames and dielectric breaks when subjected to temperatures of 800° C.-1000° C. for more than 15 minutes. The coating is said to be not fire propagating, resistant to shocks, vibrations and water jets. The coating comprises two or more mica layers, one layer of polymer resin optionally charged with refractory inorganic particles, one layer of braided glass fibres impregnated with polymer resin optionally charged with refractory inorganic particles, and one outer sheath of polymer resin optionally charged with refractory inorganic particles.

GB 1582580 describes a fire resistant cable comprising two pairs, each of which is coated by a mica layer, an insulating layer comprising heat resistant rubber, a layer of thermoplastic elastomer filled with aluminium hydroxide, a glass fibre layer, a braided metal armour and an outer sheathing of polyethylene or polypropylene material. The cable is said to resist temperatures of 650-1100° C. for more than 30 minutes, and, subsequently, to resist vibrations.

US 2002/0046871 describes a fire resistant electrical cable comprising a metallic conductor, a first glass and/or mica containing layer wound with an overlap of 50%, a second glass and/or mica containing layer also wound with an overlap of 50%, and an insulating layer of plastic material, for example polyethylene, with flame-retardant additives.

The Applicant has observed that none of the electrical cables described above is concurrently fire resistant and impermeable to water in the presence of mechanical stresses.

In particular, in the electrical cable described in EP 1 798 737, the combination of copper strip and glass fibre strip does not provide sufficient protection against mechanical stresses—which can be exceptionally intense—which an electrical cable may be subjected to during rescue operations following a fire. Furthermore, in the presence of flames, the elastomeric insulating layer softens as a result of the rise in temperature, or even burns. The softened material or the ashes produced by combustion are collapsible and cannot support the outer layers of the cable, which undergo structural collapse. The latter are therefore no longer capable of providing impermeability to water and adequate protection against mechanical stresses.

In the cable described in U.S. Pat. No. 5,707,774, the silicone rubber layers enclosing the conductors also soften when the temperature rises and are combustible. In the presence of flames, therefore, they would give rise to the same problems as those mentioned above. On the other hand, the outer layers of this cable (the silicone rubber layer and the outer braided jacket made of fiberglass material) do not provide either impermeability to water or adequate protection against mechanical stresses in case of flame.

Regarding the cable described in FR 2 573 910, the outer sheath of polymer resin, optionally charged with refractory inorganic particles, ceramifies in the presence of flames, producing a residue which, although fire resistant, cannot provide adequate protection against direct mechanical stresses, as a result of which it may become water-permeable.

In the cable described in GB 1582580, the thermoplastic elastomeric layer also softens when the temperature rises, and is combustible. In the presence of flames, therefore, it would give rise to the same problems as those mentioned above. On the other hand, the outer layers of this cable (glass fibre layer, braided metal armour and outer sheathing of polyethylene or polypropylene material) do not provide impermeability to water in the presence of flames.

Regarding the electrical cable described in US 2002/0046871, its outer layer of plastic material (such as polyethylene, with flame-retardant additives) cannot impart impermeability to water to the cable in the presence of flames.

SUMMARY OF THE INVENTION

Given the above findings, the present invention tackles the problem of providing an electrical cable (particularly, but not exclusively, a low-voltage cable) which is fire resistant, impermeable to water, and capable of withstanding strong mechanical stresses.

In particular, the present invention tackles the problem of providing an electrical cable (particularly, but not exclusively, a low-voltage cable) which is capable of functioning with acceptable electrical performance when exposed to a temperature even higher than 1000° C., in the concurrent presence of water and mechanical stresses, for a period of at least three hours.

In view of the above, the Applicant has devised an electrical cable comprising discontinuously stratified inorganic insulating material in direct contact with the conductive material, and an outer barrier of polymer-metal composite material. The cable is configured so as to comprise, in an intermediate position between the conductive material and the barrier, only discontinuous layers and/or layers of non-thermally-collapsible materials. Preferably, no continuous layer of non-ceramifying elastomeric or thermoplastic material is provided within the barrier.

The present invention therefore relates to an electrical cable comprising:
 at least one conductor;
 a barrier arranged externally to said at least one conductor, said barrier comprising two first layers comprising an inorganic material and a second layer comprising a polymer-metal composite material, said second layer being interposed between said two first layers,
 wherein said electrical cable comprises, in an intermediate position between said at least one conductor and said barrier, solely discontinuous layers and/or layers of non-thermally-collapsible materials.

In the present description and claims, the term "conductor" means an element of electrically conductive material such as aluminium or copper, in the form of a solid bar or a set of joined wires.

In the present description and claims, the expression "low-voltage cable" indicates an electrical cable designed to function at a maximum voltage of 1 kV in alternate current.

In the present description and claims, the expression "discontinuous layer" indicates a layer made of material provided so as to have interruptions in the axial direction and/or in the circumferential direction of the cable. The material of this discontinuous layer may be, for example, in the form of braided wires, wound tape or wound thread.

In the present description and claims, the expression "continuous layer" indicates a layer in which the material is distributed substantially homogenously around the underlying layer. Typically, a continuous thermoplastic or elastomeric layer is produced by extrusion.

In the present description and claims, the expression "ceramifying polymer" indicates a composition comprising a polymer matrix charged with a refractory (ceramifying) material capable of forming a coherent (self-supporting) ceramic structure at a given temperature. Said composition may also comprise additives such as stabilizers and flame-resistant fillers.

Additionally, the expression "non-thermally-collapsible" indicates a material which, as the temperature rises, shows no appreciable diminution of its consistency and/or of its volume relative to its consistency and volume at room temperature.

It should be noted that the maximum temperature limit at which thermal stability is required for the materials of the present cable does not typically exceed about 1100° C. where a copper conductor melts.

In particularly advantageous embodiments of the present invention, each conductor of the cable has an insulating coating comprising at least one discontinuous layer of inorganic material and a layer of ceramifying polymer. Even more preferably, the insulating coating comprises at least two discontinuous layers of inorganic material.

If the insulating coating comprises two discontinuous layers of inorganic material and a layer of ceramifying polymer, both of the discontinuous layers are placed in radially inner positions relative to the layer of ceramifying polymer.

Advantageously, the discontinuous layer is in the form of a tape wound with an overlap equal to or higher than 20%, or preferably higher than 30%.

If two or more discontinuous layers in the form of tapes are present, they are preferably wound with opposite winding directions. The presence of two layers with opposite winding directions in the insulating coating of each conductor advantageously increases the resistance of the electrical cable to the fire flame and simultaneously imparts greater safety and robustness to the whole assembly, for example when the cable is subjected to the mechanical stresses caused by the installation.

Preferably, the inorganic material of the discontinuous layer is glass fibre and/or mica, advantageously glass fibre and mica.

A glass fibre and mica tape preferably comprises a glass fibre textile tape and a mica tape bonded together with an adhesive such as a silicone adhesive.

Advantageously, the layer of ceramifying polymer is formed by a polymer charged with refractory additives such as oxides of titanium, zirconium, magnesium, silicon, aluminium and/or calcium, or silicates of magnesium, aluminium and/or calcium. Preferably, the polymer is chosen from among silicone rubber, ethylene propylene rubber, ethylene vinyl acetate, and ethylene propylene diene monomer.

The inorganic material of each first layer of the barrier preferably comprises glass fibre and/or mica, or more preferably glass fibre and mica.

Each first layer preferably comprises a respective tape wound around all the conductors with an overlap equal to or higher than 20%.

The tapes of the two first layers are preferably wound in opposite winding directions.

The second layer of polymer-metal composite material preferably comprises a polyester tape having one metallized side, advantageously with copper or aluminium.

Preferably, the polyester of the second layer of the barrier is polyethylene terephthalate.

Advantageously, the tape of the second layer is wound on the first radially inner layer with an overlap equal to or higher than 20%.

One or more discontinuous layers, for example a screen formed by a tape of polymer-metal composite material, may be provided between the insulating coating of the conductors and the barrier.

If this electrical cable is subjected to fire, the discontinuous layer of inorganic material and the layer of ceramifying polymer of the insulating coating show stable behaviour, i.e. they do not soften and do not collapse. In particular, the ceramifying polymer forms a layer of compact ashes, slightly increasing its own volume. The screen, if present, positioned radially outside the polymer, has a discontinuous structure and therefore does not hinder the slight expansion of the ceramifying polymer, and does not hinder any propagation of fumes along the cable which contributes to preserve the integrity of the whole cable. The structural stability of the whole cable is thus advantageously maintained even in the presence of fire. In particular, the integrity of the barrier is suitably conserved. Because of its three-layered structure and of the nature of these layers, this barrier provides the cable with high impermeability to water and to mechanical stresses, even in the presence of fire.

BRIEF DESCRIPTION OF THE DRAWINGS

The present invention will be illustrated more in greater detail by the appended drawings, provided by way of non-limiting example, in which:

FIGS. 1a and 1b are, respectively, a perspective view and a sectional view of a low-voltage electrical cable according to a first embodiment of the present invention; and FIGS. 2a and 2b are, respectively, a perspective view and a sectional view of a low-voltage electrical cable according to a second embodiment of the present invention.

DETAILED DESCRIPTION OF THE INVENTION

FIGS. 1a and 1b show a low-voltage electrical cable 1 according to a first embodiment of the present invention.

The electrical cable 1 preferably comprises one or more conductors, for example three conductors 10. Each conductor 10 comprises a plurality of metal wires 11, made of copper or tinned annealed copper. The conductor 10 may be, for example, a Class 2 or Class 5 conductor as defined in the IEC 60228 standard, 3rd edition, 2004-11.

Around each conductor 10 an insulating coating formed by one or more layers of material which is non-thermally-collapsible up to a temperature of, for example, 1050° C. is provided.

In the case of the cable 1 of FIG. 1a, the insulating coating of each conductor 10 comprises two discontinuous layers 12a, 12b of inorganic insulating material, for example glass fibre and/or mica. The discontinuous layers 12a, 12b are preferably each in the form of a tape wound on the conductor 10. Advantageously, each of these tapes is wound with an overlap equal to or higher than 30%. A glass fibre and mica tape preferably comprises a glass fibre textile tape and a mica tape bonded together with a silicone adhesive. The glass fibre and mica tapes forming the discontinuous layers 12a, 12b are conveniently wound with opposite winding directions.

The insulating coating of the conductor 10 also comprises a continuous layer 13 of ceramifying polymer positioned radially outside the discontinuous layers 12a, 12b. For example, the layer 13 is formed by a polymer filled with ceramifying additives (also called refractory additives) such as oxides of titanium, zirconium, magnesium, silicon, aluminium and/or calcium, or silicates of magnesium, aluminium and/or calcium. In particular, the layer 13 comprises a ceramifying silicone rubber. As an alternative to silicone rubber, it is possible to provide, as the polymer base, ethylene propylene rubber (EPR), ethylene vinyl acetate (EVA), or ethylene propylene diene monomer (EPDM). The layer 13 is preferably extruded on to the discontinuous layers 12a, 12b.

Optionally, as shown in FIG. 1b, the insulating coating of the conductor 10 may comprise a further discontinuous layer 12c positioned outside the continuous layer 13. The further discontinuous layer 12c is substantially similar (in composition and thickness, for example) to the layers 12a, 12b.

The widths of the discontinuous layers 12a, 12b, 12c, whose thickness is preferably of from 0.08 to 0.20 mm, depend on the diameter underlying the tape (the diameter of the conductor 10 in the case of the layers 12a, 12b, or the diameter of the conductor 10 and of the layers 12a, 12b and 13 in the case of the layer 12c) and on the overlap, and are preferably of from 6 to 60 mm. The thickness of the ceramifying polymer layer 13 depends on the cross section of the conductor 10 as defined in the IEC 60092-353 standard, 3rd edition (2008-2), Table 1. For example, if the cross section of the conductor 10 has an area of from 1.5 mm² to 16 mm², the total thickness of the layer 13 is preferably about 1.0 mm.

The conductors 10 are preferably stranded together with a suitable length of lay along the axial or longitudinal direction of the cable 1.

The electrical cable 1 comprises a barrier 14 which encloses the conductors 10 and their insulating coating.

In the example of FIGS. 1a, 1b, the barrier 14 comprises two first layers of inorganic material 14a, 14c and a second layer of polymer-metal composite material 14b interposed between the two first layers 14a, 14c.

Each first layer 14a, 14c preferably comprises glass fibre and/or mica. In particular, each first layer 14a, 14c preferably comprises a respective glass fibre and/or mica tape, wound around the conductors 10 with an overlap equal to or higher than 20%. The glass fibre and mica tape preferably comprises a glass fibre textile tape and a mica tape bonded together with a silicone adhesive. The two glass fibre and mica tapes forming the two layers 14a, 14c are preferably wound in opposite winding directions. The width of said tapes depends on the diameter of the underlying element and on the overlap, and is preferably of from 20 mm to 80 mm, the thickness being preferably of from 0.08 mm to 0.20 mm.

The second layer of polymer-metal composite material 14b preferably comprises a polyester tape (preferably made of polyethylene terephthalate or PET) having a c side metallized with copper (Cu/PET tape) or aluminium (Al/PET tape). Preferably, said tape of composite material has a total thickness of from 0.036 to 0.060 mm. The Cu/PET or Al/PET tape is preferably wound on the layer 14a with an overlap equal to or higher than 20%.

The interstices outside the conductors 10 and their insulating layers and enclosed by the barrier 14 may be left empty or, as shown in FIGS. 1a and 1b, may be filled, at least partially, with filler elements 15. The filler elements 15 preferably comprise a low smoke halogen-free (LSHF) polymer material.

Optionally, the conductors, their insulating layers and the filler elements (if present) may be collectively wound with a discontinuous layer of polyester, for example a polyethylene terephthalate (PET) tape, or of polymer-metal composite, for example a tape made of polyester (preferably PET) having a side metallized with copper (Cu/PET tape) or aluminium (Al/PET tape). In the case of a discontinuous polymer-metal composite layer, this may act as a screen.

Outside the barrier 14, the cable 1 comprises a metallic armour 16. The metallic armour 16 preferably comprises a plurality of braided metal wires (particularly wires made of copper or tinned copper). The metallic armour 16 preferably fits to the IEC 60092-350 standard, 3rd edition, 2008-02, Section 4.8.

Optionally, the electrical cable 1 may comprise a separator 17 positioned outside the metallic armour 16. The separator 17 preferably comprises one or more tapes of synthetic material, preferably polyester (PET), wound on the armour 16.

Finally, the electrical cable 1 comprises an outer sheath 18. The outer sheath 18 preferably comprises a thermoplastic material, more preferably a halogen-free thermoplastic or cross-linked material, e.g. EVA,—for example, a thermoplastic material of type SHF1 or SHF2, or possibly of the "mud resistant" type—. The thickness of the outer sheath sitably fits the specifications of the IEC 60092-353 standard, 3rd edition, 2011-08, Section 5.9.

Advantageously, the electrical cable 1 does not comprise any combustible continuous layer which is collapsible at a temperature of 1000° C.-1050° C. within the barrier 14. The materials of the layers lying between the conductors 10 and the barrier 14 (i.e., glass fibre and/or mica for the layers 12*a*, 12*b*, 12*c*, and ceramifying polymer for the layer 13) are indeed thermally stable and non-collapsible when subjected to temperatures of about 1000° C.-1100° C., even for periods of more than 3 hours, and even up to 6 hours.

If the electrical cable 1 is subjected to fire, the layers 12*a*, 12*b*, 12*c* and 13 show a stable behaviour; i.e., they do not soften and do not burn. In particular, the ceramifying polymer of the layer 13 ceramifies and slightly increases its volume. The structural stability of the whole electrical cable 1 is thus advantageously preserved in case of fire. In particular, the integrity of the barrier 14 is advantageously preserved. Thanks to the composition of its three layers 14*a*, 14*b*, 14*c*, the barrier 14 imparts to the electrical cable 1*a* high impermeability to water and resistance to mechanical stresses, even in the presence of high temperatures due to fire.

FIGS. 2*a* and 2*b* show a low-voltage electrical cable 1' according to a second embodiment of the present invention.

The electrical cable 1' preferably comprises one or more pairs of conductors, for example two pairs of conductors 10'.

Each conductor 10' preferably comprises a plurality 11' of metal wires, made of copper or tinned annealed copper. The conductor 10' may be, for example, a Class 2 or Class 5 conductor as defined by the IEC 60228 standard, $3^{rd}$ edition, 2004-11.

Each conductor 10' is enclosed by an insulating coating formed by one or more materials which are non-thermally-collapsible up to a temperature of 1050° C., for example.

The insulating coating of each conductor 10' is substantially similar, in respect of layers and materials, to the insulating coating of the conductors 10 of the electrical cable 1 shown in FIGS. 1*a* and 1*b*; that is, it comprises two discontinuous layers 12'*a*, 12'*b* of inorganic insulating material, a layer of ceramifying polymer 13', and, optionally, a further layer of glass fibre and mica 12'*c* positioned outside the layer of ceramifying polymer 13'.

The widths of the discontinuous layers 12'*a*, 12'*b*, 12'*c*, whose thickness is preferably of from 0.08 to 0.20 mm, depend on the diameter underlying the tape (the diameter of the conductor 10', in the case of the layers 12'*a*, 12'*b*; or the diameter of the conductor 10 and of the layers 12'*a*, 12'*b* and 13', in the case of the layer 12'*c*) and on the overlap, and are preferably of from 6 to 60 mm. The thickness of the ceramifying polymer layer 13' depends on the cross section of the conductor 10' as defined by the IEC 60092-376 standard, $2^{nd}$ edition, 2003-05, Table 2. For example, if the cross section of the conductor 11' has an area of 0.75 mm$^2$ or 1.0 mm$^2$, the total thickness of its insulating coating (in other words the layer 13') is preferably about 0.6 mm.

The conductors 10' are preferably twisted together in sets of two so as to form two pairs of conductors. The pairs are then also twisted together. In embodiments not shown in the drawings, the cable may comprise a number of conductors twisted together in sets of three.

In embodiments of the present invention, the electrical cable 1' also comprises a barrier 14' positioned outside the pairs of conductors 10'.

The barrier 14' is substantially similar, in respect of layers and materials, to the barrier 14 of the electrical cable 1 shown in FIGS. 1*a* and 1*b*; that is, it comprises two layers of inorganic material 14*a'*, 14*c'* (preferably glass fibre and mica tape) and a layer of polymer-metal composite material 14*b'* (preferably, Cu/PET tape or Al/PET tape) interposed between the two layers of inorganic material 14*a'*, 14*c'*.

Outside the barrier 14', the cable 1' preferably comprises a metallic armour 16', an optional separator 17' and an outer sheath 18', substantially similar to the metallic armour 16, the separator 17 and the outer sheath 18 of the electrical cable 1 shown in FIGS. 1*a* and 1*b*.

Advantageously, the electrical cable 1' also does not comprise any combustible continuous layer which is collapsible at a temperature of 1000° C.-1050° C. within the barrier 14'. The materials of the layers lying between the conductors 10' and the barrier 14' (i.e., glass fibre and/or mica for the layers 12'*a*, 12'*b*, 12'*c*, and ceramifying polymer for the layer 13') are indeed thermally stable and non-collapsible when subjected to temperatures of about 1000° C.-1100° C., even for periods of more than 3 hours, and even up to 6 hours. In a way similar to cable 1 shown in FIGS. 1*a* and 1*b*, also the cable 1' according to the second embodiment of the present invention therefore maintains its structural stability and its impermeability to water even in the presence of fire.

A description is given below of the results of fire resistance tests in the presence of water and mechanical stresses, which were carried out on some electrical cables according to embodiments of the present invention and on some comparative cables.

The set-up used for the fire resistance tests is substantially as specified in the IEC 60331-1 or 2 standard, $1^{st}$ ed., 2009-05. However, differing from the provisions of this standard, the electrical cables were exposed to a temperature higher than 1000° C. (up to 1050° C.) for a period of from 180 minutes (3 hours) to 360 minutes (6 hours).

During the fire resistance test, the cables were also subjected to a water spray (simulating the operation of firefighting sprinklers) and to mechanical shocks as specified in the EN 50200:2006 standard, Annex E. The electrical cables with an outer diameter greater than 20 mm were also subjected to a water jet (substantially simulating a hydrant jet), according to the provisions of the BS8491:2008 standard, paras, 5.5 and 5.6. Thus the test set-up reproduced the extreme conditions in which the electrical cables may have to operate in case of fire.

The results of the tests conducted on the comparison cables and on the cables according to embodiments of the present invention are given below.

Comparative Cable A

The structure of the comparative cable A was as follows:
10 pairs of conductors with a cross-sectional area of 1 mm$^2$;
insulating coating of each conductor comprising a glass fibre and mica layer, a ceramifying silicone rubber layer and a further glass fibre and mica layer;
Al/PET screen on each pair of insulated conductors;
inner sheath made of EPR;
barrier comprising a glass fibre and mica layer, a Cu/PET layer and a glass fibre and mica layer;
armour;
outer sheath made of EVA.

The comparative cable A was subjected for 180 minutes to a temperature of 1000° C. and a voltage of 150/250 V, in the presence of a water spray with a flow rate of 0.8 l/min and a water jet with a flow rate of 12 l/min.

The comparative cable A did not pass the test. In particular, after a few minutes of exposure to the temperature of 1000° C., the EPR sheath burnt and triggered a structural collapse of the barrier. Thus the water penetrated into the cable, causing a short circuit of the conductors.

Comparative Cable B

The structure of the comparative cable B was as follows:
10 pairs of conductors with a cross-sectional area of 1 mm²;
insulating coating of each conductor comprising a glass fibre and mica layer and a ceramifying silicone rubber layer;
Al/PET screen on each pair of insulated conductors;
inner sheath made of EPR;
barrier comprising a glass fibre and mica layer, a Cu/PET layer and a glass fibre and mica layer;
armour;
outer sheath made of EVA.

The comparative cable B was subjected for 180 minutes to a temperature of 1000° C. and a voltage of 150/250 V, in the presence of a water spray with a flow rate of 0.8 l/min and a water jet with a flow rate of 12 l/min.

The comparative cable B did not pass the test. In particular, after a few minutes of exposure to the temperature of 1000° C., the EPR sheath burnt and triggered a structural collapse of the barrier. Thus the water penetrated into the cable, causing a short circuit of the conductors.

Comparative Cable C

The structure of the comparative cable C is as follows:
19 conductors with a cross-sectional area of 1.5 mm²;
insulating coating of each conductor comprising a glass fibre and mica layer and a ceramifying silicone rubber layer;
Al/PET screen on each insulated conductor;
inner sheath made of EPR;
barrier comprising a glass fibre and mica layer, a Cu/PET layer and a glass fibre and mica layer;
armour;
outer sheath made of EVA.

The comparative cable C was subjected for 180 minutes to a temperature of 1000° C. and a voltage of 0.6/1 kV, in the presence of a water spray with a flow rate of 0.8 l/min and a water jet with a flow rate of 12 l/min.

The comparative cable C did not pass the test. In particular, after a few minutes of exposure to the temperature of 1000° C., the EPR sheath burnt and triggered a structural collapse of the barrier. Thus the water penetrated into the cable, causing a short circuit of the conductors.

Cable D

The structure of the cable according to the invention is as follows:
10 pairs of conductors with a cross-sectional area of 1 mm²;
insulating coating of each conductor comprising a glass fibre and mica layer and a ceramifying silicone rubber layer;
Al/PET screen on each pair of insulated conductors;
barrier comprising a glass fibre and mica layer, a Cu/PET layer and a glass fibre and mica layer;
separator tape made of polyester;
armour;
outer sheath made of low smoke emission EVA.

The cable was subjected for 360 minutes to a temperature of 1050° C. and a voltage of 150/250 V, in the presence of mechanical shock, a water spray with a flow rate of 0.8 l/min and a water jet with a flow rate of 12 l/min.

The cable passed the test.

The invention claimed is:

1. An electrical cable comprising:
at least one conductor;
a barrier arranged externally to said at least one conductor, said barrier comprising two first layers comprising an inorganic material and a second layer comprising a tape of a polymer-metal composite material, said second layer being interposed between said two first layers,
wherein said electrical cable comprises, in an intermediate position between said at least one conductor and said barrier, solely discontinuous layers and/or layers of thermally not collapsible materials.

2. The electrical cable according to claim 1, wherein the at least one conductor of the electrical cable has an insulating coating comprising at least one discontinuous layer of inorganic material and a layer of ceramifying polymer.

3. The electrical cable according to claim 2, wherein the insulating coating comprises at least two discontinuous layers of inorganic material.

4. The electrical cable according to claim 3, wherein said at least two discontinuous layers are provided in a radially internal position with respect to the layer of ceramifying polymer.

5. The electrical cable according to claim 2, wherein the at least one discontinuous layer is in a form of a tape wound with an overlap equal to or higher than 20%.

6. The electrical cable according to claim 4, wherein the at least two discontinuous layers are tapes which are wound with opposite winding directions.

7. The electrical cable according to claim 2, wherein the inorganic material of the at least one discontinuous layer is glass fiber and/or mica.

8. The electrical cable according to claim 2, wherein the layer of ceramifying polymer is made of a polymer filled with refractory additives.

9. The electrical cable according to claim 2, wherein the layer of ceramifying polymer comprises silicone rubber.

10. The electrical cable according to claim 1, wherein the inorganic material of each first layer of the barrier comprises glass fiber and mica.

11. The electrical cable according to claim 1, wherein the first layers comprise, respectively, a tape which is wound around all conductors with an overlap equal to or higher than 20%.

12. The electrical cable according to claim 1, wherein the second layer comprises a tape of polyester having a metallic face.

13. The electrical cable according to claim 12, wherein the metallic face is copper or aluminium.

14. The electrical cable according to claim 12, wherein the polyester of the second layer of the barrier is polyethylene terephthalate.

15. The electrical cable according to claim 1, wherein the second layer is a tape which is wound on the radially internal first layer with an overlap equal to or higher than 20%.

* * * * *